United States Patent
Rashley et al.

(10) Patent No.: US 12,497,316 B2
(45) Date of Patent: Dec. 16, 2025

(54) CAST CULLET-BASED LAYER ON WALL PANEL FOR A MELTER

(71) Applicant: Owens-Brockway Glass Container Inc., Perrysburg, OH (US)

(72) Inventors: Shane Rashley, Bowling Green, OH (US); Brian Coburn, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 589 days.

(21) Appl. No.: 16/993,825

(22) Filed: Aug. 14, 2020

(65) Prior Publication Data

US 2022/0388886 A1 Dec. 8, 2022

(51) Int. Cl.
*C03B 5/44* (2006.01)
*C03B 5/43* (2006.01)
*F27D 1/00* (2006.01)

(52) U.S. Cl.
CPC . *C03B 5/43* (2013.01); *C03B 5/44* (2013.01)

(58) Field of Classification Search
CPC .......................................... C03B 5/2353–2356
See application file for complete search history.

(56) References Cited

U.S. PATENT DOCUMENTS

| | | | | |
|---|---|---|---|---|
| 2,702,751 A * | 2/1955 | Austin | ..................... | C04B 35/03 501/116 |
| 3,202,735 A * | 8/1965 | Smith | ..................... | B28B 1/04 501/121 |
| 3,245,830 A * | 4/1966 | Flexon | ..................... | C03B 5/43 65/346 |
| 3,659,029 A | 4/1972 | DeBussy | | |
| 3,726,699 A * | 4/1973 | Nelson | ................ | C04B 35/0473 501/115 |
| 3,967,943 A | 7/1976 | Seeley | | |
| 4,103,391 A | 8/1978 | Thomsen | | |
| 4,225,443 A | 9/1980 | Harris et al. | | |
| 4,275,258 A * | 6/1981 | Harmsen | ................... | F27D 1/12 373/76 |
| 4,298,374 A | 11/1981 | Savolskis et al. | | |
| 4,921,521 A | 5/1990 | Kremenets | | |
| 4,987,211 A * | 1/1991 | Araps | ..................... | C08F 2/38 526/329.7 |
| 5,030,594 A | 7/1991 | Heithoff | | |
| 5,147,741 A * | 9/1992 | Araps | ..................... | C04B 41/88 430/311 |

(Continued)

FOREIGN PATENT DOCUMENTS

| | | | | |
|---|---|---|---|---|
| CN | 101511743 A | | 8/2009 | |
| EP | 2167434 A1 | * | 3/2010 | ............... C03B 5/00 |

(Continued)

OTHER PUBLICATIONS

Furness Sodium Silicate as an adhesive Journal of the Society of Chemical Industry vol. 41, Issue 18, p. 381 (Year: 1922).*

(Continued)

*Primary Examiner* — Jodi C Franklin

(57) ABSTRACT

A furnace panel for a melting furnace and a method for fabricating the furnace panel are disclosed. In particular, the furnace panel can include at least one outer wall having an inner surface; and a cast sacrificial layer carried by the inner surface of the at least one outer wall and composed of a mixture of cullet and a binder solution.

13 Claims, 12 Drawing Sheets

(56) References Cited

U.S. PATENT DOCUMENTS

| | | | |
|---|---|---|---|
| 5,447,547 | A | 9/1995 | Goldfarb et al. |
| 6,116,888 | A * | 9/2000 | Johnston ............... B29C 33/306 |
| | | | 249/102 |
| 6,735,237 | B2 | 5/2004 | Duch et al. |
| 9,051,199 | B2 * | 6/2015 | Dewet-Smith .......... C03B 3/023 |
| 9,145,319 | B2 | 9/2015 | Mobley et al. |
| 9,206,068 | B2 | 12/2015 | McGinnis et al. |
| 9,493,372 | B2 * | 11/2016 | Lefrere ..................... C03B 5/44 |
| 9,587,825 | B2 | 3/2017 | Lefrere et al. |
| 9,656,903 | B2 | 5/2017 | McGinnis et al. |
| 9,776,902 | B2 | 10/2017 | Mobley et al. |
| 9,902,639 | B2 | 2/2018 | Mobley et al. |
| 11,268,763 | B1 * | 3/2022 | Olver ........................ F27B 3/16 |
| 2002/0094930 | A1 * | 7/2002 | Brown .................. F27D 1/0006 |
| | | | 501/123 |
| 2004/0157725 | A1 * | 8/2004 | Doza ..................... C04B 35/101 |
| | | | 501/95.1 |
| 2008/0057275 | A1 | 3/2008 | Grzesik et al. |
| 2011/0083473 | A1 | 4/2011 | Engels et al. |
| 2011/0088600 | A1 * | 4/2011 | MacRae .................. C21B 7/163 |
| | | | 29/890.035 |
| 2011/0236846 | A1 * | 9/2011 | Rue ......................... F27B 3/205 |
| | | | 432/195 |
| 2011/0308280 | A1 * | 12/2011 | Huber ...................... F23D 14/32 |
| | | | 65/347 |
| 2013/0086950 | A1 * | 4/2013 | Huber ..................... C03B 5/193 |
| | | | 65/347 |
| 2013/0250996 | A1 * | 9/2013 | Ki ........................... F27B 3/085 |
| | | | 373/75 |
| 2013/0283861 | A1 * | 10/2013 | Mobley .................. C03B 5/167 |
| | | | 65/135.1 |
| 2013/0327092 | A1 * | 12/2013 | Charbonneau .......... C03B 3/023 |
| | | | 65/29.21 |
| 2014/0007622 | A1 * | 1/2014 | Shock ........................ C03B 5/20 |
| | | | 65/335 |
| 2014/0274652 | A1 * | 9/2014 | Mastek ................... C03C 3/087 |
| | | | 501/27 |
| 2014/0338571 | A1 * | 11/2014 | Evans ................... C04B 18/027 |
| | | | 264/43 |
| 2015/0175464 | A1 * | 6/2015 | Lefrere ................... C03B 5/265 |
| | | | 65/135.1 |
| 2015/0251941 | A1 * | 9/2015 | Clark .................... C03B 5/2252 |
| | | | 65/374.13 |
| 2016/0122221 | A1 * | 5/2016 | Huber ...................... C03B 5/44 |
| | | | 65/346 |
| 2016/0297706 | A1 * | 10/2016 | Naito ........................ C03C 3/16 |
| 2017/0284872 | A1 | 10/2017 | Cowles et al. |
| 2017/0369352 | A1 * | 12/2017 | Huber ...................... F23J 15/06 |
| 2018/0057387 | A1 * | 3/2018 | Faulkinbury ............. C03B 5/44 |
| 2018/0065877 | A1 * | 3/2018 | Faulkinbury ........... C03B 5/167 |
| 2018/0105470 | A1 * | 4/2018 | Dejneka ............... C04B 35/4885 |
| 2018/0111866 | A1 * | 4/2018 | Macphee ................. C03B 5/44 |
| 2018/0216888 | A1 * | 8/2018 | Manasek ................ F27D 11/08 |
| 2018/0313532 | A1 | 11/2018 | Luka et al. |
| 2019/0161377 | A1 * | 5/2019 | Cowles ..................... C03B 5/44 |
| 2020/0087214 | A1 * | 3/2020 | Debastiani .......... C04B 35/1015 |
| 2020/0340746 | A1 * | 10/2020 | Guillet ...................... F27D 1/16 |
| 2020/0386648 | A1 * | 12/2020 | Luccini ................. G01M 3/2807 |
| 2021/0009457 | A1 * | 1/2021 | Rashley ................... C03B 5/44 |
| 2021/0094863 | A1 * | 4/2021 | Rashley ................ C03B 5/2356 |

FOREIGN PATENT DOCUMENTS

| | | | |
|---|---|---|---|
| FR | 1306851 | 11/1961 | |
| GB | 803457 | 10/1958 | |
| KR | 102214645 B1 * | 2/2021 | .......... C03B 5/2356 |
| RS | 55252 B1 * | 2/2017 | .......... C03B 5/2356 |
| WO | 9117402 | 11/1991 | |
| WO | 2008157533 A1 | 12/2008 | |
| WO | WO-2021144536 A1 * | 7/2021 | ............... C03C 1/00 |

OTHER PUBLICATIONS

Machine translation of RS55252 (Year: 2017).*
International Search Report and Written Opinion, Int. Application No. PCT/US2021/045313, Int. Filing Date: Aug. 10, 2021, Mail Date: Nov. 12, 2021.
Colombian Office Action, Application No. NC2022/0019288, Applicant: Owens-Brockway Glass Container Inc., Dated: Oct. 12, 2023.
Chile Informe de Busqueda (Search Report), No. 202203814, Applicant: Owens-Brockway Glass Container Inc., Dated: Mar. 1, 2024.
Chile Pericial (Expert Report), No. 202203814, Applicant: Owens-Brockway Glass Container Inc., Dated: Mar. 1, 2024.

* cited by examiner

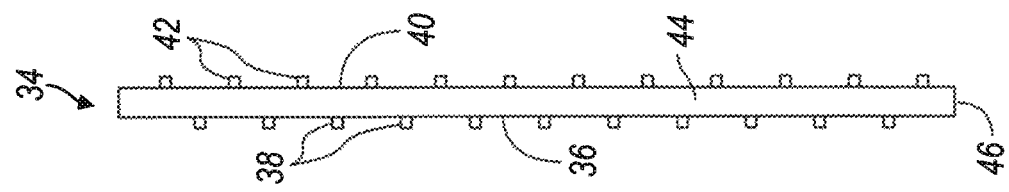
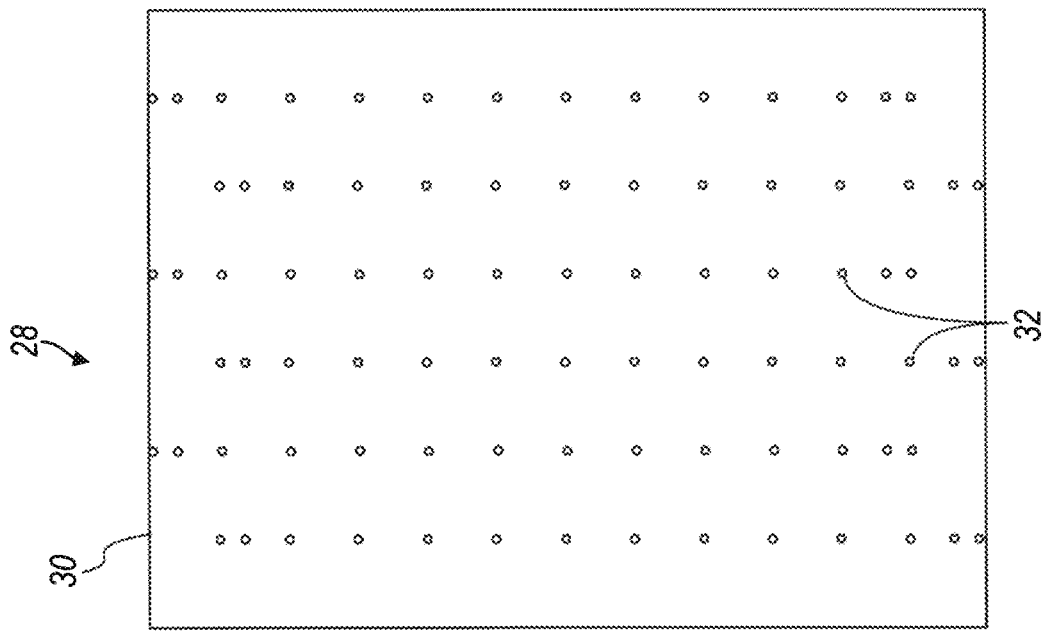
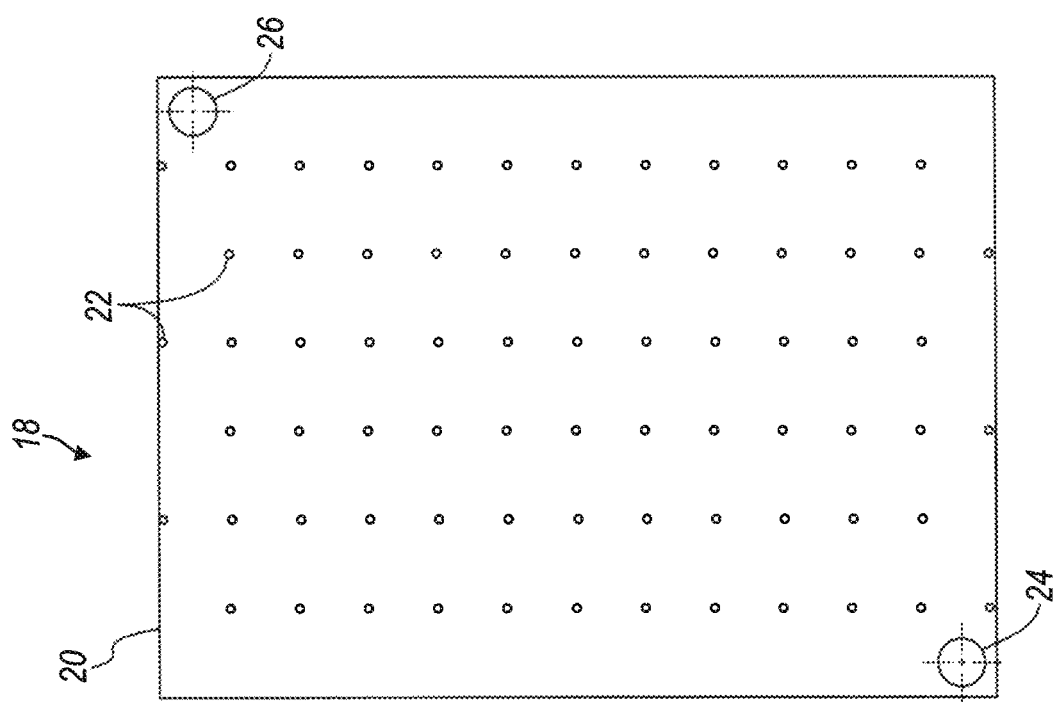

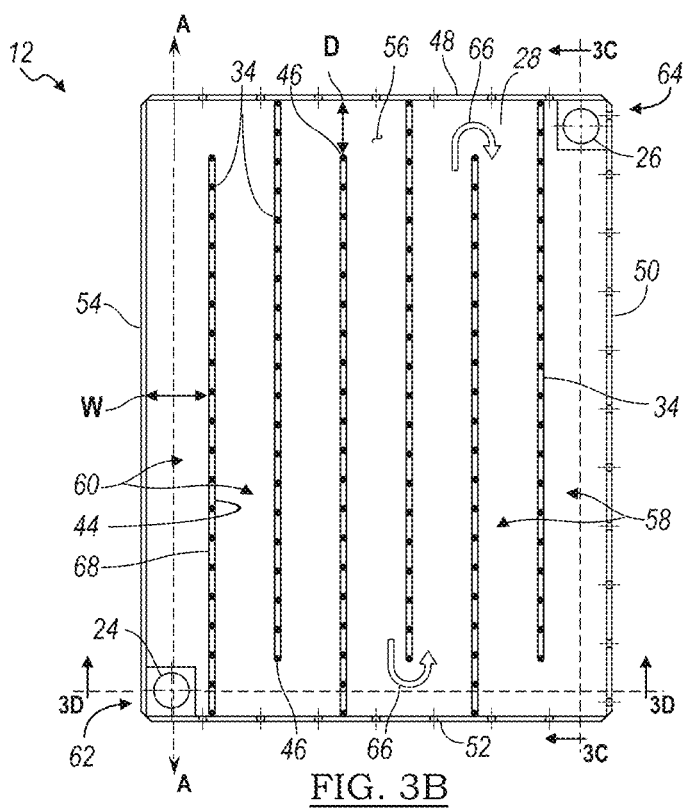

CAST CULLET-BASED LAYER ON WALL PANEL FOR A MELTER

TECHNICAL FIELD

This patent application discloses devices and methods for use in glass manufacturing, and more particularly, devices to provide fluid cooling for a melter.

BACKGROUND

Glass manufacturing often occurs at high temperatures that require the equipment used in the glass manufacturing process to withstand harsh conditions. In particular, submerged combustion melting ("SCM") is a specific type of glass manufacturing, in which an air-fuel or oxygen-fuel mixture is injected directly into a pool of molten glass. As combustion gases forcefully bubble through the molten glass, they create a high-heat transfer rate and turbulent mixing of the molten glass until it achieves a uniform composition. A typical submerged combustion melter has a floor, a vertical burner passage extending through the floor, and a burner positioned within the burner passage and submerged in the molten glass.

In order to withstand the harsh conditions and temperatures within the melter for traditional glass manufacturing or SCM, a portion of the melter's floor, walls, and/or roof that contacts the molten glass can include a refractory material.

BRIEF SUMMARY OF THE DISCLOSURE

The present disclosure embodies a number of aspects that can be implemented separately from or in combination with each other.

A melting furnace panel in accordance with one aspect of the disclosure includes at least one outer wall having an outer surface; and a cast sacrificial layer carried by the outer surface of the at least one outer wall and composed of a mixture of cullet and a binder solution.

In accordance with another aspect of the disclosure, there is provided a melting furnace including the melting furnace having at least one melting furnace panel, the panel including at least one outer wall having an outer surface; and a cast sacrificial layer carried by the outer surface of the at least one outer wall and composed of a mixture of cullet and a binder solution.

In accordance with another aspect of the disclosure, there is provided a method of producing a glass melting furnace panel including the steps of providing at least one outer wall having an outer surface; mixing cullet particulates with a binder solution to produce a cullet and binder mixture; and casting the cullet and binder mixture on the outer surface of the at least one outer wall to produce a cast sacrificial layer carried by the outer surface of the at least one outer wall.

BRIEF DESCRIPTION OF THE DRAWINGS

The disclosure, together with additional objects, features, advantages and aspects thereof, will be best understood from the following description, the appended claims and the accompanying drawings, in which:

FIG. 2A is a side view of a first outer wall of the furnace panel included in the melting furnace shown in FIGS. 1A and 1B, in accordance with an illustrative aspect of the present disclosure;

FIG. 2B is a side view of a second outer wall of the furnace panel included in the melting furnace shown in FIGS. 1A and 1B, in accordance with an illustrative aspect of the present disclosure;

FIG. 2C is a side view of a baffle of the furnace panel included in the melting furnace shown in FIGS. 1A and 1B, in accordance with an illustrative aspect of the present disclosure;

FIG. 3B is a front view of the furnace panel shown in FIG. 3A, illustrated with baffles and with one outer wall removed, in accordance with an illustrative aspect of the present disclosure;

FIG. 3C is a cross-sectional side view of the furnace panel shown in FIGS. 3A and 3B, showing a cast sacrificial layer disposed on one outer wall and a frozen material layer disposed on the cast sacrificial layer, in accordance with an illustrative aspect of the present disclosure;

FIG. 3D is a cross-sectional top view of the furnace panel shown in FIGS. 3A through 3C, showing multiple baffles in the interior space of the furnace panel, in accordance with an illustrative aspect of the present disclosure;

DETAILED DESCRIPTION

In accordance with at least one aspect of the disclosure, a furnace panel for a melting furnace is provided that is better able to withstand the harsh conditions of the melting furnace than prior furnace panels and prevents refractory stone issues in the molten material and final product.

Harsh environments within a melting furnace, for example in glass manufacturing and particularly in submerged combustion melting, can lead to wear, cracking, erosion, and/or failure of the furnace floor, walls, and/or roof. The furnace floor, walls, or roof can be constructed of panels that include a steel portion and a refractory material portion coupled to the steel portion, where the refractory material portion may contact a molten material within the melting furnace. Temperatures in the melting furnace can be between approximately 1300-1500 degrees Celsius (° C.) or higher, for example, and the molten material may be corrosive. The refractory material portion can be designed to be resistant to the high temperatures and corrosiveness within the furnace. But due to the harsh conditions and turbulence within the melting furnace, the panels and/or the refractory material portion can be susceptible to the wear, cracking, erosion, and/or failure because of direct contact with the molten material. To slow wear and erosion of the refractory material portion, traditional furnace walls are often constructed of steel, liquid-cooled, and include 1.5-2 inches of a castable refractory on an inside surface of the furnace walls. However, even with this construction, the castable refractory can still erode away over time and cause refractory stone to appear in the molten material and final product.

Accordingly, a melter furnace having at least one furnace panel is disclosed, wherein each furnace panel can be cooled and can include a cast sacrificial layer comprising a binder and cullet. Upon initial heating of the melting furnace, the cast sacrificial layer fuses together providing an insulating layer that reduces heat flux through the furnace panels. Additionally, the cast sacrificial layer can comprise a composition that is the same or similar to the molten material so that when erosion of the cast sacrificial layer occurs, the eroded material will be melted into the surrounding molten material in the melting furnace and will not contribute to refractory stone in a final product.

Figure 1A:
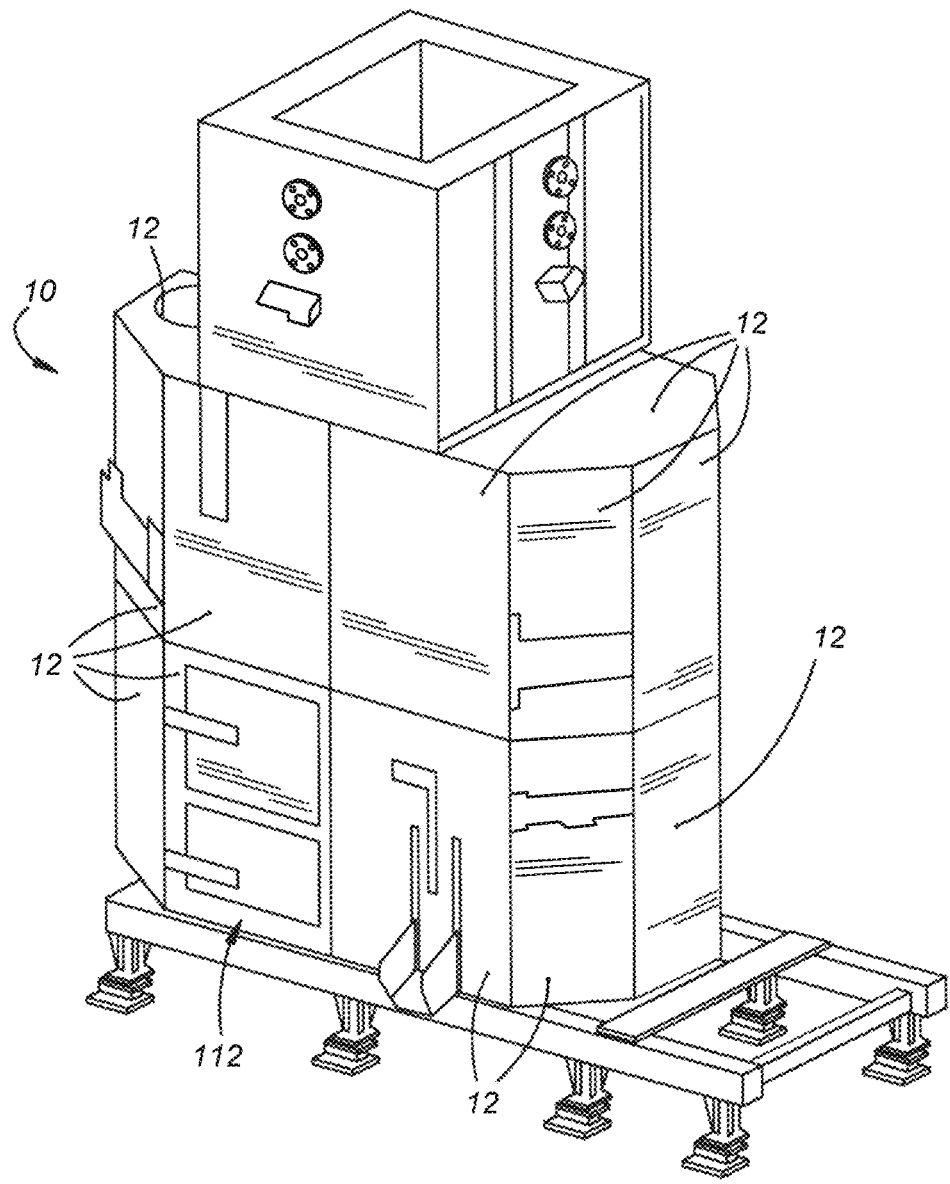
FIG. 1A is an isometric view of a melting furnace having at least one furnace panel, in accordance with an illustrative embodiment of the present disclosure.

Referring to FIG. 1A, a melting furnace 10 is shown comprising at least one furnace panel 12. The melting furnace 10 can be configured for melting and/or containing a molten material. For example, the melting furnace 10 may include a glass melter (e.g., a submerged combustion melter) or a furnace for melting metal.

Shown in FIG. 1A, a floor, walls, and a roof of the melting furnace 10 may comprise interchangeable furnace panels 12. The furnace panels 12 may be configured to both provide structure to the melting furnace 10 and provide cooling to at least a portion of the molten material. It is contemplated that the melting furnace 10 may be comprised entirely of multiple furnace parcels 12 or may comprise only one or several furnace panels 12.

Figure 1B:
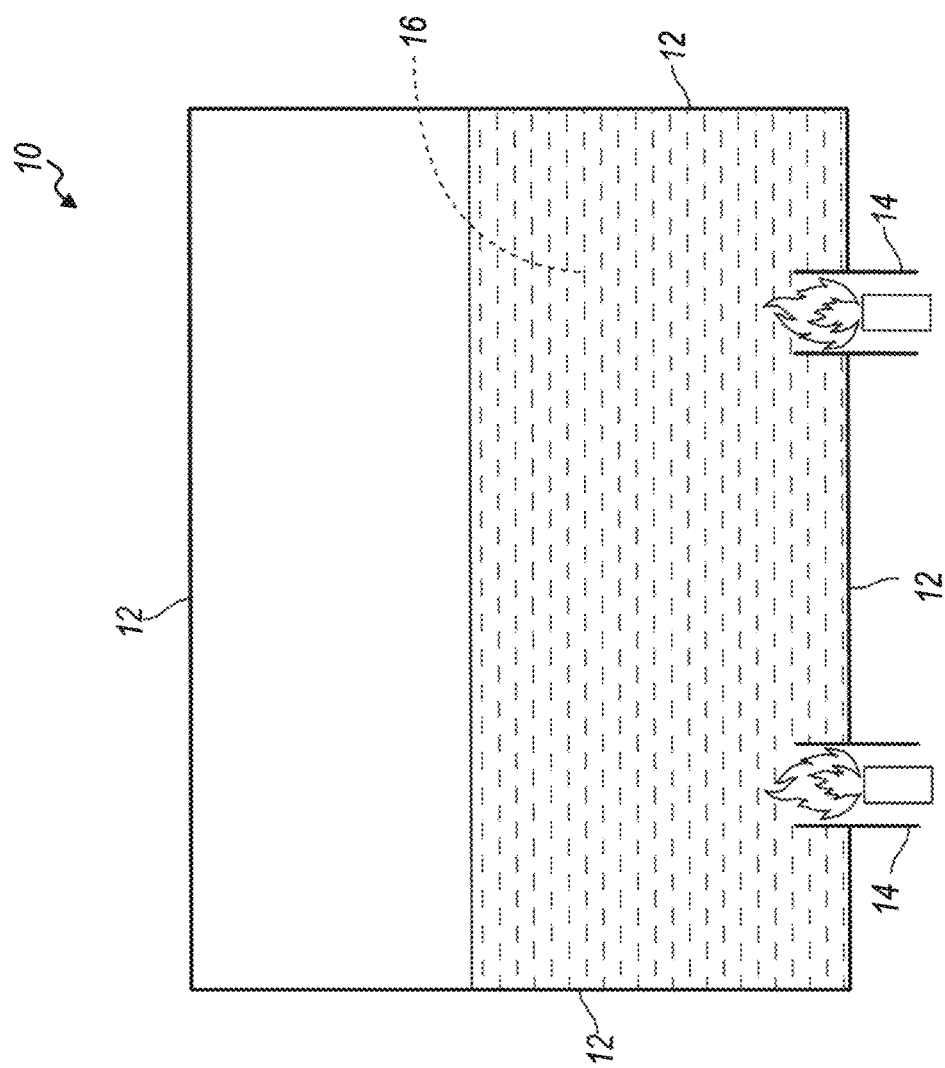
FIG. 1B is a cross-sectional view of the melting furnace illustrated in FIG. 1A, in accordance with an illustrative aspect of the present disclosure.

FIG. 1B depicts a cross-sectional view of the melting furnace 10 comprised of multiple furnace panels 12 and submerged combustion burners 14. FIG. 1B also illustrates some of the furnace panels 12 fully or partially contacting molten material 16 within the melting furnace 10 and some of the furnace panels 12 not contacting the molten material 16.

Referring to FIG. 2A, each furnace panel 12 can include a first outer wall 18, which can include a first perimeter 20 and a plurality of first openings 22. The first openings 22 and are depicted as holes or slots, although other configurations may be included. For example, even though the first openings 22 are depicted as having a circular cross-section or as slots, they may also be configured with a variety of cross-sections and/or shapes, including oval, rectangular, square, triangular, other types of polygons, or the like. The first outer wall 18 is also depicted as including a coolant inlet 24 and a coolant outlet 26. The first outer wall 18 can be formed of a material suitable for withstanding a high temperature environment of the melting furnace 10, for example steel.

FIG. 2B illustrates a second outer wall 28 of the furnace panel 12. The second outer wall 28 can include a second perimeter 30 and a plurality of second openings 32. The second openings 32 are depicted as holes or slots, although other configurations may be included. For example, even though the second openings 32 are depicted as having a circular cross-section or as slots, they could also be configured with a variety of cross-sections and/or shapes, including oval, rectangular, square, triangular, other types of polygons, or the like. In some instances, the second outer wall 28 may include a coolant inlet (not shown) and a coolant outlet (not shown) instead of or in addition to the coolant inlet 24 and the coolant outlet 26 in the first outer wall 18. The second outer wall 28 can be formed of a material suitable for withstanding a high temperature environment of the melting furnace 10, for example steel. Those of ordinary skill in the art would recognize that the first outer wall 18 and/or the second outer wall 28 are outer walls in the context of the furnace panel 12, even though the furnace panel 12 may also be an outer wall of and/or an inner wall (e.g., a baffle) within the melting furnace 10 as a whole.

FIG. 2C illustrates a baffle 34 of the furnace panel 12, where each furnace panel 12 can include at least one baffle 34. Each baffle 34 can have a first side 36 with respective first projections 38 and an opposing second side 40 with respective second projections 42. Additionally, each baffle 34 can comprise a first longitudinal surface 44 and an open transverse surface 46 configured to be open and not be coupled to anything else (e.g., exposed to coolant). While the open transverse surface 46 in FIG. 2C is shown at a bottom of the baffle 34, it will be appreciated that the open transverse surface 46 could also be located at the top of the baffle 34.

In the embodiment shown in FIG. 2C, the first projections 38 and the second projections 42 are depicted as tabs extending from both the first side 36 and the second side 40 of the baffle 34, although the first projections 38 and the second projections 42 may be configured in other ways. As depicted, the first projections 38 extend from the first side 36 of the baffle 34 and are configured to fit in respective first openings 22 of the first outer wall 18, and the second projections 42 extend from the second side 40 of the baffle 34 and are configured to fit in respective second openings 32 of the second outer wall 28. It will be appreciated that the first projections 38 and the second projections 42 may comprise other configurations, for example posts, studs, screws, rivets, slugs, bolts, welds, welded pieces, or the like.

Figure 3A:
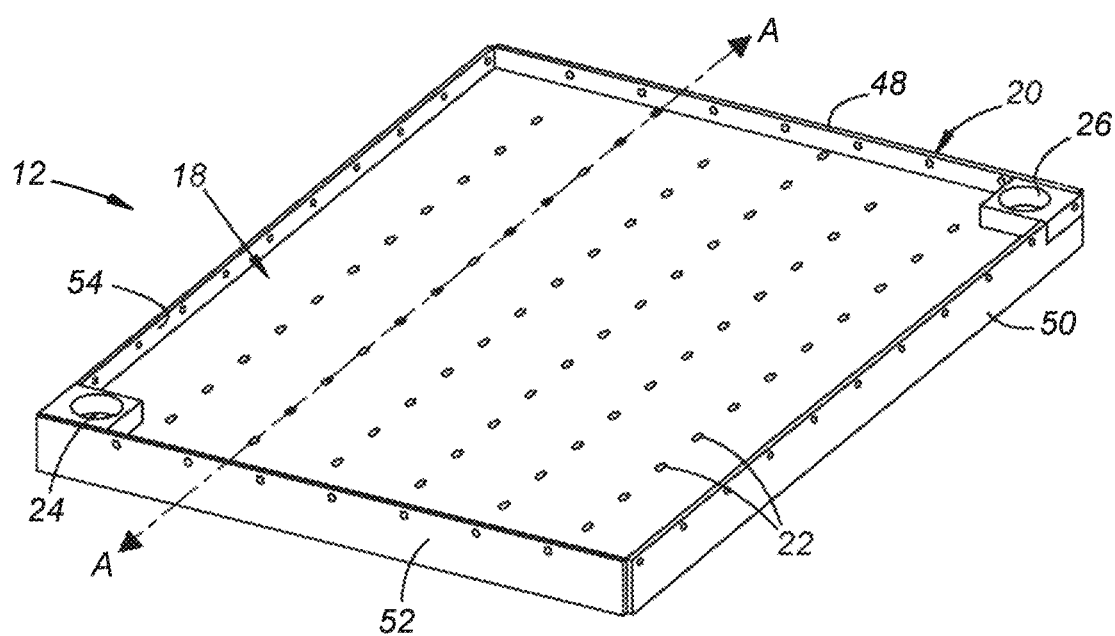
FIG. 3A is an isometric view of the furnace panel included in the melting furnace shown in FIGS. 1A and 1B, illustrated without baffles and with one outer wall removed, in accordance with an illustrative aspect of the present disclosure.

FIG. 3A illustrates an embodiment of the furnace panel 12 showing one outer wall (e.g., the first outer wall 18) coupled (e.g., welded) to a plurality of side walls 48, 50, 52, 54 with a second outer wall (e.g., the second outer wall 28) and the baffles 34 removed. The side walls 48, 50, 52, 54 can be coupled to the first outer wall 18 around and/or proximate to the first perimeter 20. The side walls 48, 50, 52, 54 can also be configured to be coupled (e.g., welded) to the second outer wall 28 around and/or proximate to the second perimeter 30 to form at least a portion of the furnace panel 12. FIG. 3A also illustrates one arrangement of the coolant inlet 24 and the coolant outlet 26.

Additionally, FIG. 3A illustrates one arrangement of the first openings 22 in the first outer wall 18, where the first openings 22 are arranged parallel to a longitudinal axis A and configured to be coupled with respective first projections 38 of each baffle 34. The second outer wall 28 and the baffles 34 are shown removed in FIG. 3A, but the second outer wall 28 may also include a similar arrangement of second openings 32 arranged parallel to a longitudinal axis (e.g., the longitudinal axis A) and configured to be coupled with respective second projections 42.

FIG. 3B illustrates a fragmentary cross-sectional view of the furnace panel 12 showing the second outer wall 28 removed. The furnace panel 12 is shown with a plurality of side walls 48, 50, 52, 54 and a plurality of baffles 34 coupled to the first outer wall 18, where the baffles 34 each include the open transverse surface 46. The first outer wall 18 and the second outer wall 28, when coupled with the side walls 48, 50, 52, 54, define an interior space 56 with fluid passages 58 through which a coolant can flow. The fluid passages 58 can be aligned and/or correspond with a respective row 60. It will be appreciated that the second outer wall 28 may also be arranged similar to the first outer wall 18 as shown in FIG. 3A.

FIG. 3B illustrates a fragmentary cross-sectional view of the furnace panel 12 showing the first outer wall 18 removed. The furnace panel 12 is shown with a plurality of side walls 48, 50, 52, 54 and a plurality of baffles 34 coupled to the first outer wall 18, where the baffles 34 each include the open transverse surface 46. The first outer wall 18 and the second outer wall 28, when coupled with the side walls 48, 50, 52, 54, define an interior space 56 with fluid passages 58 through which a coolant can flow. The fluid passages 58 can be aligned and/or correspond with a respective row 60. It will be appreciated that the second outer wall 28 may also be arranged similar to the first outer wall 18 as shown in FIG. 3A.

In the furnace panel 12, the coolant can flow through a serpentine fluid flow path 66. The baffles 34 function to divide the interior space 56 into a plurality of rows 60, where each respective row 60 can be parallel with the longitudinal axis A and can have a width W. The width W can be between baffles 34 or between one baffle 34 and an adjacent side wall 50, 54. In order to provide a uniform width W for each row 60, the width W between baffles 34 may be the same as the width W between the one baffle 34 and the adjacent side wall 50, 54.

Additionally, each baffle 34 can comprise a pair of longitudinal surfaces including a first longitudinal surface 44 and an opposing second longitudinal surface 68. Each baffle 34 can also include an open transverse surface 46 configured to not be coupled to another component and to be exposed to the interior space 56 and/or coolant. FIG. 3B shows a plurality of open transverse surfaces 46 that alternate between the bottom of the baffle 34 and an opposite end at a top of the baffle 34.

With conventional technology, a furnace panel would typically be constructed such that baffles were welded, for example stitch welded or intermittently welded, along a joint between a respective baffle and one of the first and second outer walls from within the interior space. These internal welds have been necessary to hold the baffles in place prior to attaching the first and/or second outer walls.

When manufacturing the furnace panel 12, the furnace panel 12 can be formed so that the first openings 22 and the second openings 32 and the first projections 38 and the second projections 42 fit together, respectively, in order to secure the first outer wall 18 and the second outer wall 28 to the baffles 34. In an example, the first and second openings 22, 32 and the projections 38, 42 can be held together by clamps until welds have been made and connected together from outside of the furnace panel 12 so that no interior welds are necessary within the interior space 56 of the furnace panel 12. Once the at least one baffle 34 has been coupled to an outer wall 18, 28, the other of the first and second outer walls 18, 28 can include one or more holes that matches the location of the baffles 34, and the other of the first and second outer walls 18, 28 can be placed on top of the baffles 34 for welding, for example plug welding or a weld at the holes, to couple to the baffles 34. The plug welding can occur from outside of the furnace panel 12. Subsequently, the side walls 48, 50, 52, 54 can be welded, for example fillet welded or welded along a joint between two parts at an angle to each other, to the first and second outer walls 18, 28 to form a fluid-tight furnace panel 12. With the disclosed first and second openings 22, 32 and projections 38, 42, the first and second outer walls 18, 28 and the baffles 34 can be fitted together without needing to internally weld either of the first and second outer walls 18, 28 to the baffles 34 before also fitting the other of the first and second outer walls 18, 28 to the baffles 34, which can save time and cost in construction. This can also reduce the chance for any errors in positioning first and second outer walls 18, 28 and the baffles 34 together. Welds can be made from outside the furnace panel 12 such that liquid-tight joints result. Additionally, the first and second outer walls 18, 28 and the baffles 34 can be more easily cut, including being laser-cut, to the correct geometries.

FIG. 3C illustrates a cross-section view of the furnace panel 12 along line 3C in FIG. 3B showing the side walls 48, 52 and the first and second outer walls 18, 28 forming the interior space 56. The side walls 48, 52 and the first and second outer walls 18, 28 can be coupled, for example, using a fillet weld 70. The coolant outlet 26 is also shown.

FIG. 3C also illustrates one or more protrusions 72, for example studs having enlarged heads, extending from the second outer wall 28 that are configured to at least partially carry a cast sacrificial layer 74 disposed on the second outer wall 28. In this way, the one or more protrusions 72 can be configured to embed into the cast sacrificial layer 74 to assist the second outer wall 28 in carrying the cast sacrificial layer 74. It will be appreciated that the one or more protrusions 72 may include a variety of configurations, for example screws, tabs, posts, rivets, slugs, bolts, welds, welded pieces, or other members that can be formed of any suitable material known in the art, including steel, various metals, refractory material, or the like.

The cast sacrificial layer 74 shown in FIG. 3C can include a mixture of at least cullet and a binder. The cullet can be a material similar to material being molten by the melting furnace 10. Some examples of cullet can include glass cullet, which may be finely milled in a crushed or a powdered from, or cullet formed from other material, for example a metal. When the cullet includes glass cullet, the cullet particulates may include, for example, a mean particulate size of between 5-100 micrometers, including all ranges, sub-ranges, endpoints, and values in that range. One example of a binder may include sodium silicate (e.g., sodium metasilicate).

For example, the cast sacrificial layer 74 may comprise 65%-85% glass cullet by weight and 15%-35% binder solution by weight, including all ranges, sub-ranges, endpoints, and values in those ranges. The binder solution can include 5%-25% binder by weight mixed with 75%-95% water by weight. It is contemplated that a cullet-to-binder ratio may include other suitable ratios where the binder holds the cullet together and forms the cast sacrificial layer 74. As shown in FIG. 3C, the cast sacrificial layer 74 may be disposed on the second outer wall 28, for example between about 0.5 inch and 2 inches thick including all ranges, sub-ranges, endpoints, and values in that range, although the cast sacrificial layer 74 may include other suitable thicknesses. Additionally, in one instance, the cast sacrificial layer 74 may be cast on the second outer wall 28 at an area density of about 22 lbs./310 in$^2$ (10 kg/2000 cm$^2$). In one instance, the cast sacrificial layer 74 may be cast on the second outer wall 28 at a bulk density between 50-80 lb./ft$^3$, including all ranges, subranges, endpoints, and values therein.

The molten material 16 in the melting furnace 10 can typically exist in a liquid or semi-liquid state. In some instances, however, a portion of the molten material 16 that flows closer to at least one furnace panel 12 of the melting furnace 10 may become a solid (or at least a very viscous state) because of its lower temperature, due to a cooling effect from the at least one furnace panel 12 of the melting furnace 10, than a first portion of the molten material 16. The solidified material (e.g., glass) can comprise a solid or frozen material layer 76 that can be coupled to the floors, walls and roof (e.g., at least one furnace panel 12). The frozen material layer 76 can protect the cast sacrificial layer 74 and the furnace panel 12 from the corrosive molten material 16.

Additionally, to assist in holding the cast sacrificial layer 74 on the second outer wall 28, the second outer wall 28 can include a first outer edge 78 disposed and extending about the second perimeter 30 of the second outer wall 28 so that the first outer edge 78 extends about the cast sacrificial layer 74, as illustrated in FIG. 3C. The first outer edge 78 may include, for example, a metal wall configured to at least partially contain the cast sacrificial layer 74. By using the one or more protrusions 72 and/or the first outer edge 78, the cast sacrificial layer 74 can be protected and better secured to the second outer wall 28. One of ordinary skill in the art will understand that, in some instances, the cast sacrificial layer 74, the one or more protrusions 72, and the first outer edge 78 may also be included in the second outer wall 28. It will be appreciated that the furnace panel 12 may also be formed without the protrusions 72 and/or the first outer edge 78.

In FIG. 3C, on the opposite side of the furnace panel 12 from the cast sacrificial layer 74, the second outer wall 28 is depicted as having a second outer edge 80 extending about the second perimeter 30. The second outer edge 80 may include a flange with a plurality of internal apertures 82, which may be equidistantly spaced. The internal apertures 82 can be formed in order to accommodate bolts, screws, fasteners, or the like, that would secure the second outer wall 28 and/or the second outer edge 80 of the furnace panel 12 to adjacent furnace panels and/or other parts of the melting furnace 10. As discussed above, the features of one of the first and second outer walls 18, 28 may be switched or additionally added to the other of the first and second outer walls 18, 28. For example, the second outer edge 80 with the internal apertures 82 could be added to or part of the second outer wall 28 and/or first outer edge 78.

FIG. 3D illustrates a cross-section view along line 3D in FIG. 3B showing an embodiment of a plurality of baffles 34 coupled to the first outer wall 18 and the second outer wall 28. Additionally, FIG. 3D shows at least one plug weld 84 between the first and second outer walls 18, 28 and the baffles 34 from the outside of the furnace panel 12. The cast sacrificial layer 74 and the one or more protrusions 72 have been omitted from the furnace panel 12 shown in FIG. 3D in order to more clearly illustrate the at least one plug weld 84.

In some implementations, the melting furnace 10 and/or one or more furnace panels 12 may include various temperature sensors. For example, one or more temperature sensors can detect the temperature within the portions of the molten material 16, the frozen material layer 76, a surface of a furnace panel 12, and/or temperature of the coolant. In other implementations, the furnace panel 12 does not include any temperature sensors for directly measuring the temperature within the portions of the molten material 16 nor does it include any temperature sensors for directly measuring the temperature of the coolant. In this implementation, various pipes, conduits, or the like (not shown) that can be adjacent to the furnace panel 12 and that route the coolant may include one or more temperature sensors for detecting and/or measuring the coolant temperature. The temperature measurements within the various pipes, conduits, or the like can provide an indirect temperature measurement of the temperature of the coolant when it is in the furnace panel 12. Of course, it will be appreciated that the furnace panel 12 can also be constructed to include various temperature sensors (e.g., a thermocouple) that directly detect and measure, for example, the temperature of the molten material 16, a surface of the molten material 16, the frozen material layer 76, the furnace panel 12, and/or the temperature of the coolant.

Figure 4A:
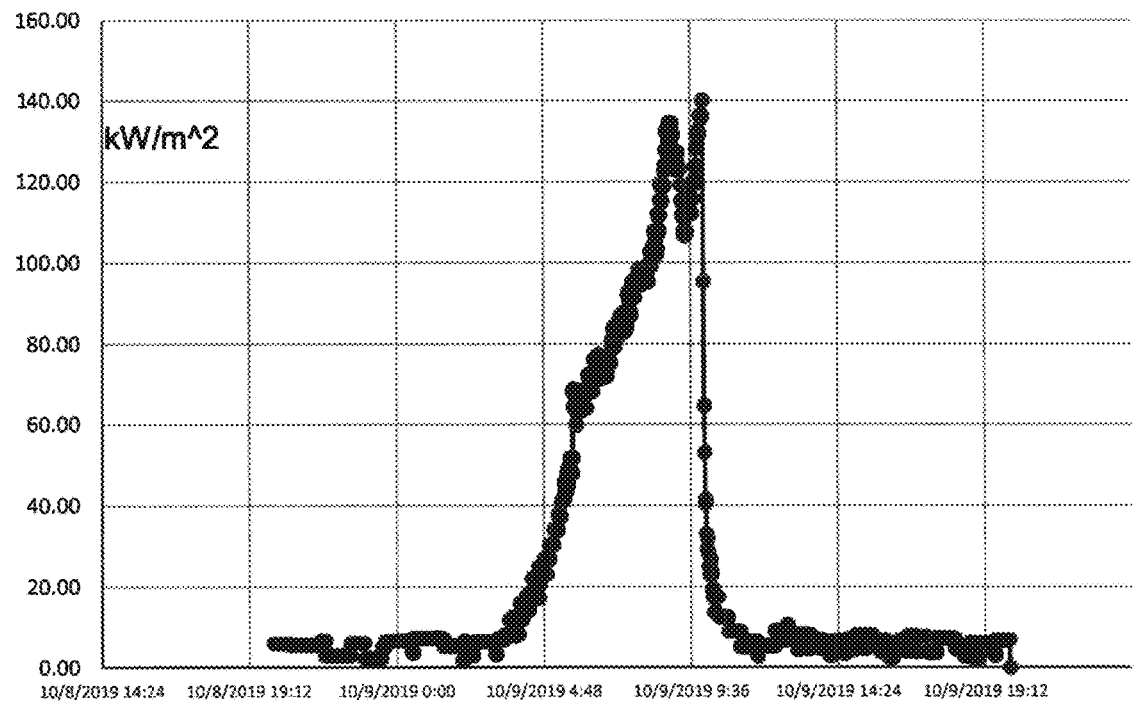
FIG. 4A is a diagrammatic view illustrating heat flux through a furnace panel during heat-up of a melting furnace without a cast sacrificial layer on the furnace panel.

FIG. 4A is a graphical depiction illustrating heat flux through a furnace panel in the melting furnace 10 upon initial heat-up. In this example, the furnace panel does not include a cast sacrificial layer 74. As shown by this graphical depiction, heat flux rises to about 140 kW/m$^2$ upon initial start-up before reaching a steady state.

Figure 4B:
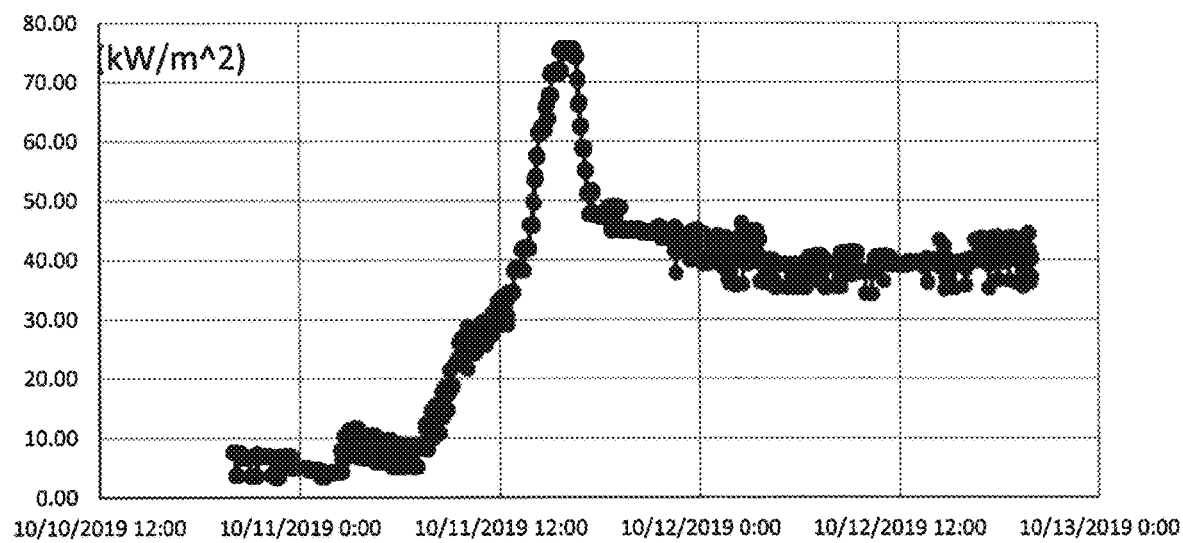
FIG. 4B is a diagrammatic view illustrating heat flux through the furnace panel, as shown in FIGS. 1A through 3D, during heat-up of a melting furnace with the cast sacrificial layer on the furnace panel.

FIG. 4B is a graphical depiction illustrating heat flux through the furnace panel 12 in the melting furnace 10 upon initial heat-up, but where the furnace panel 12 includes a cast sacrificial layer 74. As shown by this graphical depiction, heat flux through the furnace panel 12 can be decreased to about 75 kW/m$^2$ upon initial start-up before reaching a steady state. When a cast sacrificial layer 74 is used on the furnace panel 12 upon initial start-up, the cast sacrificial layer 74 acts as an insulator and less heat flux through the furnace panel 12 occurs resulting in reduced heat required for start-up and greater energy efficiency.

Figure 5:
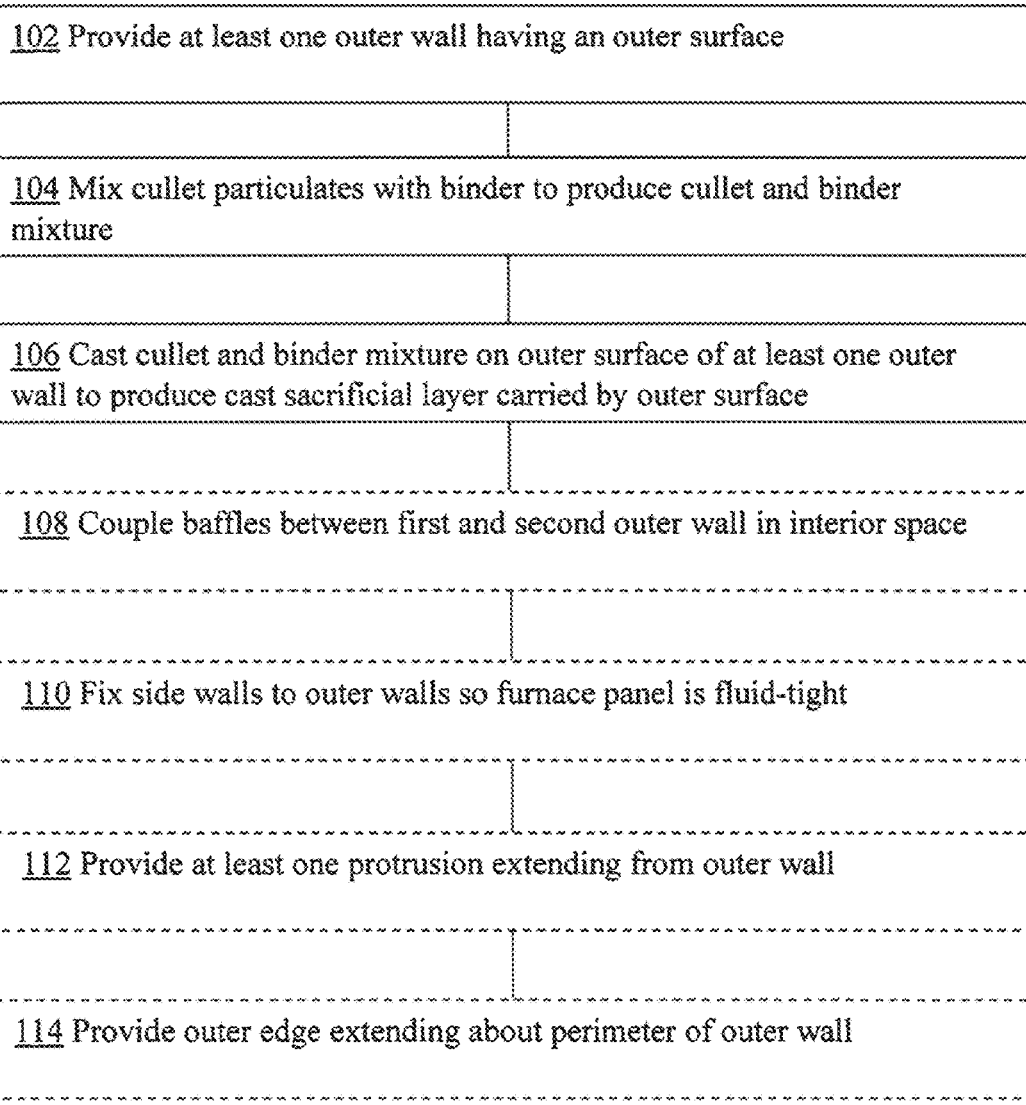
FIG. 5 is a flow diagram showing various steps of an illustrative embodiment of a method for fabricating the furnace panel as shown in FIGS. 1A through 3D.

FIG. 5 illustrates an example of a method 100 for producing a furnace panel 12. For purposes of illustration and clarity, method 100 will be described in the context of the melting furnace 10 and furnace panel 12 described above and generally illustrated in FIGS. 1A through 4B. It will be appreciated, however, that the application of the present methodology is not meant to be limited solely to such an arrangement, but rather method 100 may find application with any number of arrangements.

Figure 6:
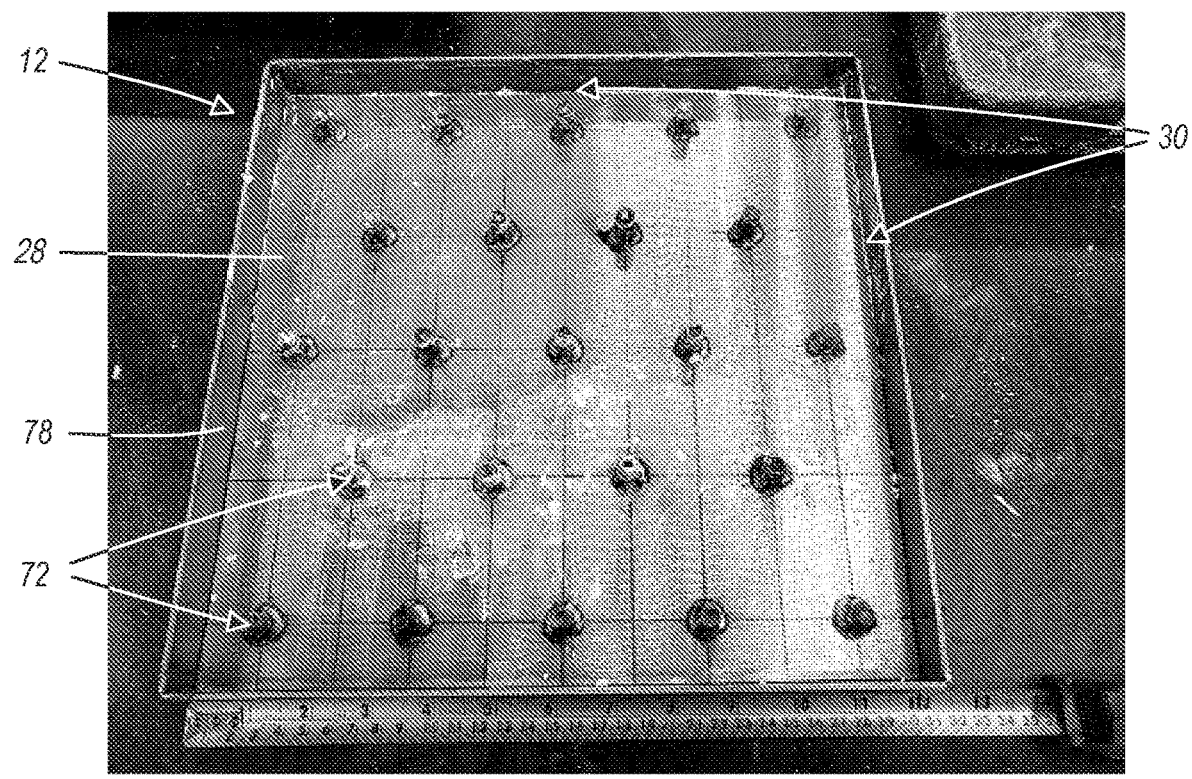
FIG. 6 is a photographic depiction illustrating a second outer wall provided for casting a cast sacrificial layer.

Method 100 includes a step 102 of providing at least one outer wall (e.g., second outer wall 28) having an outer surface. Providing the at least one outer wall can include providing at least part of a preassembled furnace panel 12 that is configured to receive and carry the cast sacrificial layer 74. In one instance and as shown in FIG. 6, the furnace panel 12 can be provided, where the second outer wall 28 includes a plurality of protrusions 72 and a first outer edge 78 disposed around the second perimeter 30. In some instances, providing the at least one outer wall may include providing only the outer wall and then providing other components of the furnace panel 12 subsequent to forming the cast sacrificial layer 74.

Method 100 includes a step 104 of mixing cullet particulates with a binder to produce a cullet and binder mixture. In an example, a powdered glass cullet can be mixed with a solution of sodium silicate (e.g., a 10% mixture with water with a pH about 12) to form a slightly wet mortar, which may be able to be molded with force and have the consistency of cement mortar, for example, but not so wet as to flow with gravity. The cullet and binder solution may be mixed in about a 4:1 ratio, for example where the cullet comprises about 65-85% and the binder solution comprises about 15-35% of the mixture, including all ranges, subranges, endpoints, and values in those ranges. The binder solution can include 5%-25% binder by weight mixed with 75%-95% water by weight, including all ranges, subranges, endpoints, and values therein. It will be appreciated that when other binders are used, the cullet-to-binder ratio may be adjusted to provide a suitable cullet and binder mixture.

Step 104 of mixing the cullet particulates with the binder may include determining the amount of cullet and binder needed for the mixture and/or the area of the second outer wall 28 to be covered. For example, about 10 kg of powdered cullet can be used for every 2000 $cm^2$ (22 lbs. powdered cullet/310 $in^2$) of surface area on the second outer wall 28 to achieve a cullet-to-binder ratio of about 4:1, which may result in a cast sacrificial layer 74 between about one and two inches thick. In this example, 2.5 kg (5.5 lbs.) of sodium silicate solution is needed to achieve the cullet-to-binder ratio of about 4:1. The sodium silicate solid may be −18 mesh or smaller for ease of dissolution in water to form a 10% solution. For example, if 3 kg (6.6 lbs.) of 10% sodium silicate solution is needed, then 0.3 kg (0.6 lbs.) of solid sodium silicate can be added to 2.7 kg (6.0 lbs.) of water. The solid sodium silicate can be mixed with the water for about 3-5 minutes or until the sodium silicate is dissolved and the solution is clear and free of solids. Continuing with the above example, 0.25 kg (0.55 lbs.) of solid sodium silicate can be mixed with 2.25 kg (4.96 lbs.) of water for 5 minutes to provide a 10% solution with a pH of about 12.

Figure 7:
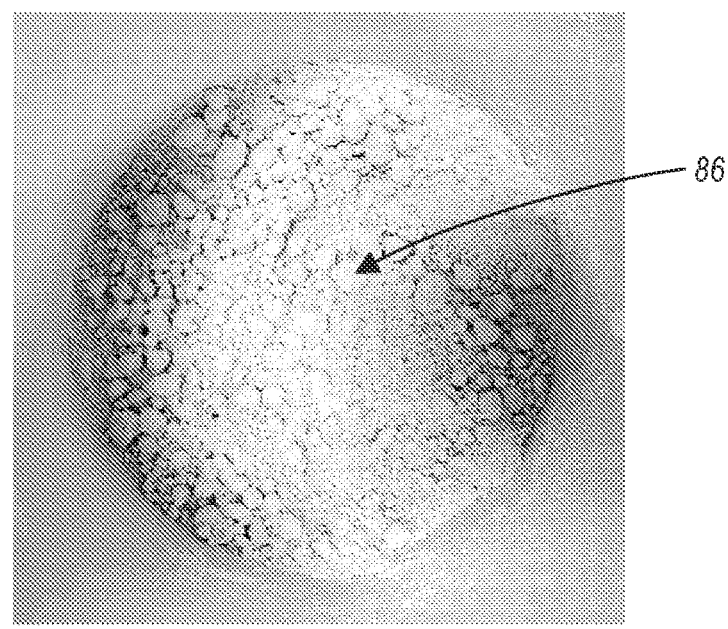
FIG. 7 is a photographic depiction illustrating a partially mixed cullet and binder solution mixture for forming a cast sacrificial layer.

The measured powdered cullet and sodium silicate solution can then be mixed to incorporate the solution into the cullet. A desired consistency of the mixture should be of a slightly wet mortar so that it can be molded with force but not so wet that it will run out of a hand. To achieve this consistency, only part of the sodium silicate solution may be added to the powdered cullet initially. For example, if there is 10 kg of powdered cullet, 1.25 kg (2.8 lbs.) (or only about half) of the sodium silicate solution may be initially added and mixed with the measured powdered cullet so the solution is well dispersed into the powder. The powdered cullet will begin to granulate and turn into small, wet balls. FIG. 7 illustrates an example of initial granulation of the mixture 86 after the first half of the sodium silicate solution is added.

Figure 8:
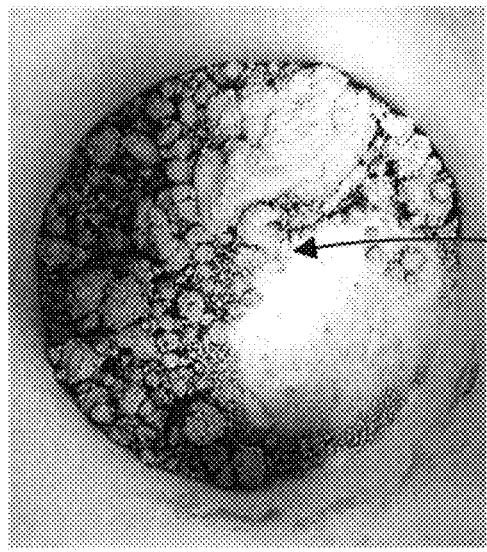
FIG. 8 is a photographic depiction illustrating the partially mixed cullet and binder solution mixture in FIG. 8, for forming a cast sacrificial layer.
Figure 9:
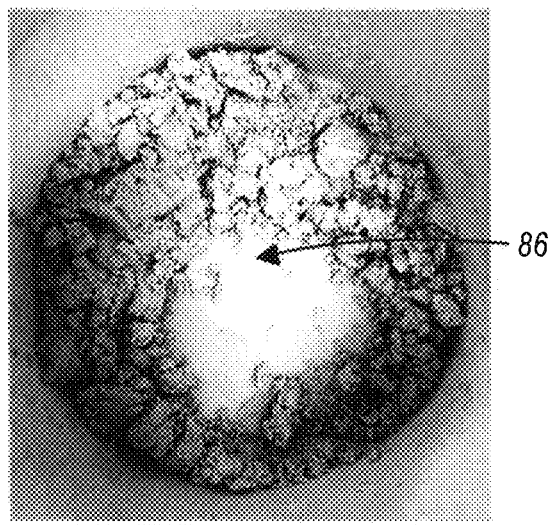
FIG. 9 is a photographic depiction illustrating the partially mixed cullet and binder solution mixture in FIGS. 7 and 8 with a sheen on its surface, for forming a cast sacrificial layer.
Figure 10:
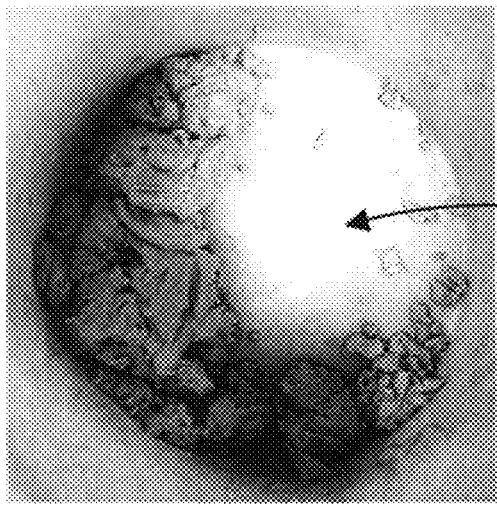
FIG. 10 is a photographic depiction illustrating the fully mixed cullet and binder solution mixture in FIGS. 7 through 9 with a sheen on its surface, for forming a cast sacrificial layer.
Figure 11:
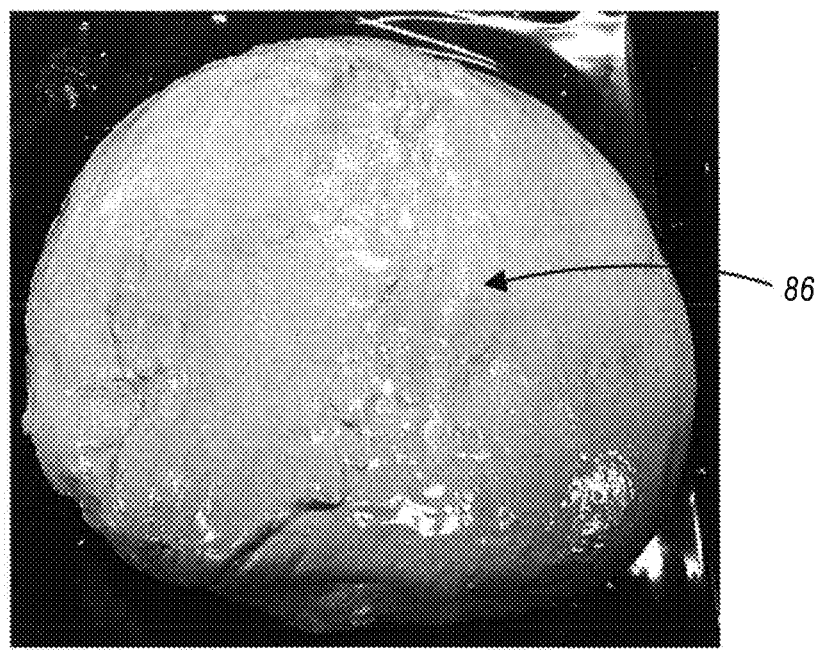
FIG. 11 is a photographic depiction illustrating the fully mixed cullet and binder solution mixture in FIGS. 7 through 10 formed into a ball, with a sheen on its surface, for forming a cast sacrificial layer.
Figure 12:
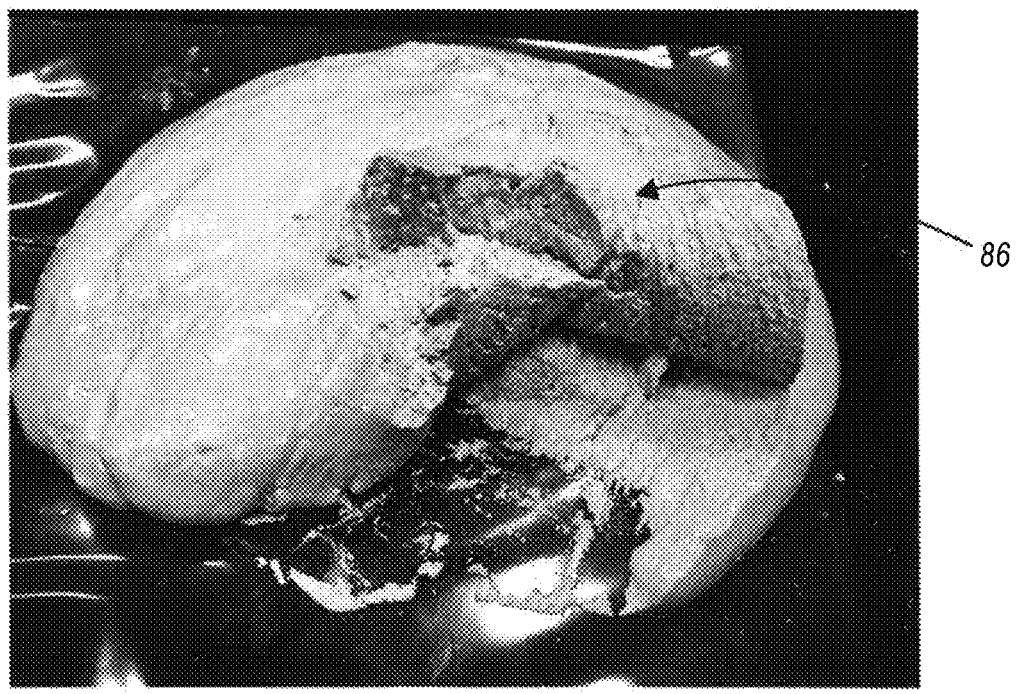
FIG. 12 is a photographic depiction illustrating the fully mixed cullet and binder solution mixture in FIGS. 7 through 11 formed into a ball with part of the mixture removed to show consistency.

After the initial sodium silicate solution is mixed with the powdered cullet, the remaining portion of solution may be added and mixed with the cullet. Continuing with the above example, the remaining 1.25 kg (2.8 lbs.) of sodium silicate solution can be added to and further mixed the mixture 86. In some instances, additional powdered cullet and/or sodium silicate solution may need to be added, in small amounts, to the mixture 86 and further mixed to achieve the desired consistency. FIG. 8 illustrates further granulation of the mixture 86 as additional sodium silicate solution is added. Shown in FIG. 9, a sheen will begin to appear on the resulting granules as the mixture 86 reaches the correct amount of solution. FIG. 10 illustrates where the mixture 86 agglomerates into a large ball with even a further sheen on the mixture 86 after sufficient sodium silicate solution has been added and adequate mixing has occurred. FIG. 11 illustrates a further example of a sufficiently mixed mixture 86 with a sheen of liquid on a surface of the mixture 86, and where the mixture 86 can be formed into a smooth ball. FIG. 12 illustrates an inside portion of the sufficiently mixed mixture 86 shown in FIG. 11, which is not very wet but has the consistency of a clay or a cement mortar and will not flow.

Figure 13:
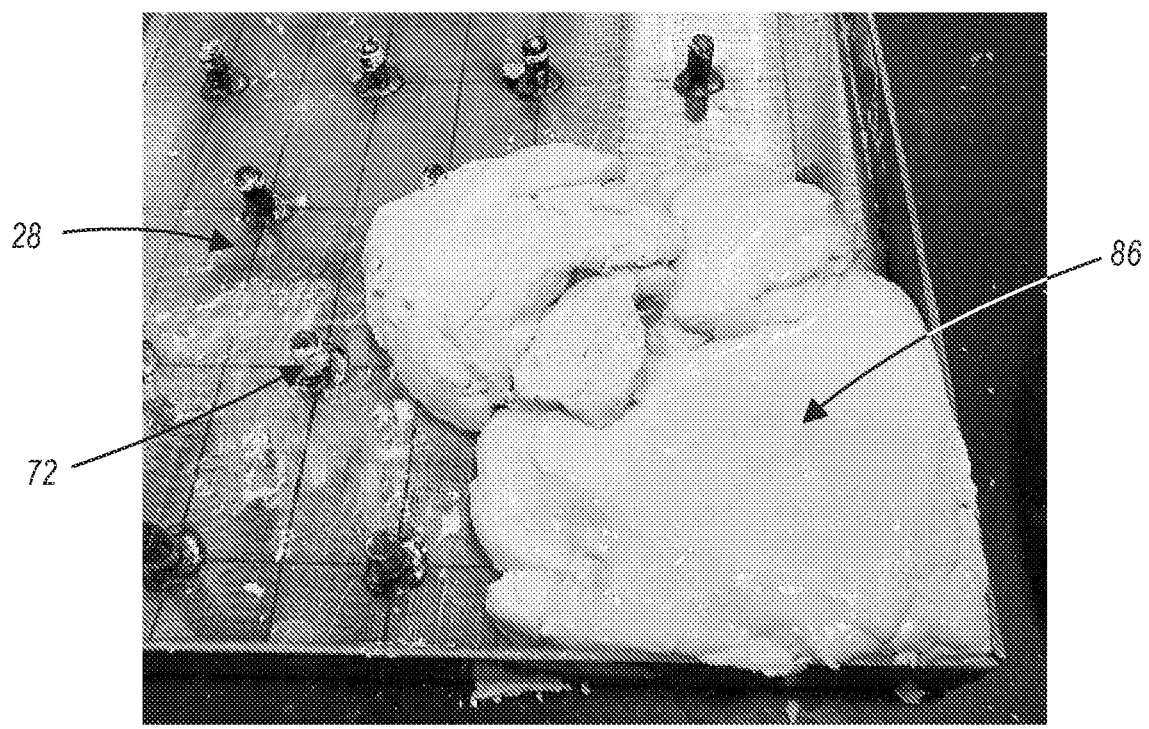
FIG. 13 is a photographic depiction illustrating a step of casting a cast sacrificial layer, where the cullet and binder solution mixture mixed in FIGS. 7 through 12 is applied to a portion of the second outer wall in FIG. 6.
Figure 14:
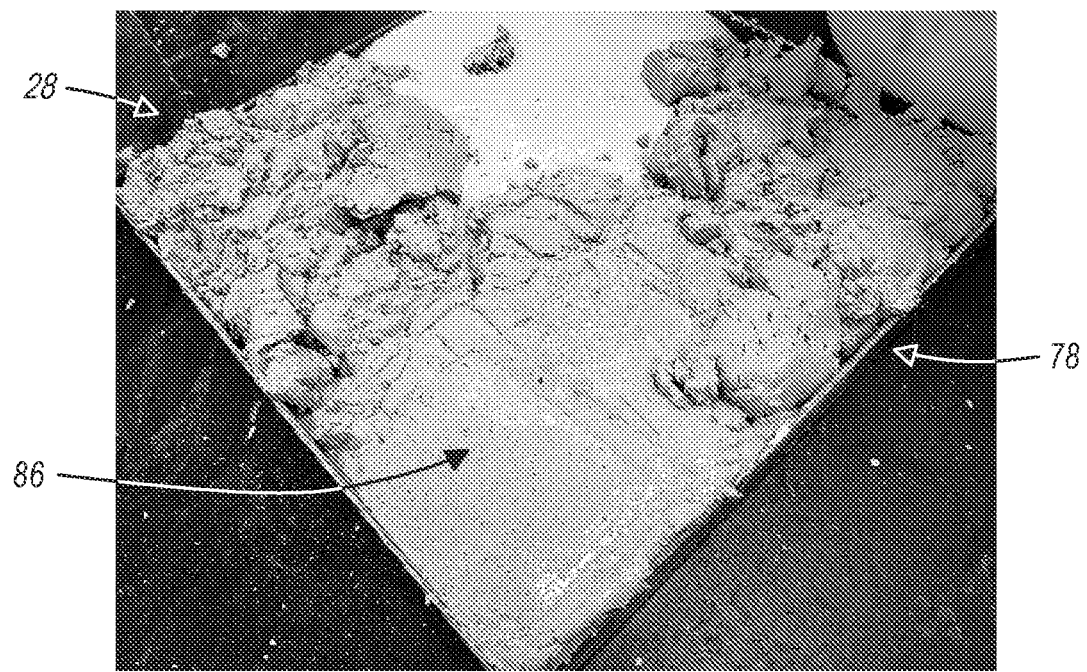
FIG. 14 is a photographic depiction illustrating a step of casting a cast sacrificial layer, where the cullet and binder solution mixture mixed in FIGS. 7 through 12 is applied to an entire surface of the second outer wall in FIG. 6.

Method 100 may include a step 106 of casting the cullet and binder mixture on the outer surface of the at least one outer wall to produce the cast sacrificial layer 74 carried by the outer surface of the at least one outer wall (e.g., second outer wall 28). Casting the cullet and binder mixture can include placing the cullet and binder mixture 86 prepared in step 104 on at least a portion of the outer surface of the at least one outer wall. For example, the cullet and binder mixture mixed in step 104 can be placed on the outer surface between, for example, 0.5 and 2 inches thick, including all ranges, subranges, endpoints, and values in that range. It will be appreciated that the cullet and binder mixture may be applied to form other suitable thicknesses. One example of casting the cullet and binder mixture is illustrated in FIG. 13, where the mixture 86 is shown being applied to and partially covering the second outer wall 28 and protrusions 72. FIG. 14 illustrates where the mixture 86 has been applied to and is completely covering the second outer wall 28 and the plurality of protrusions 72 within the first outer edge 78.

Figure 15:
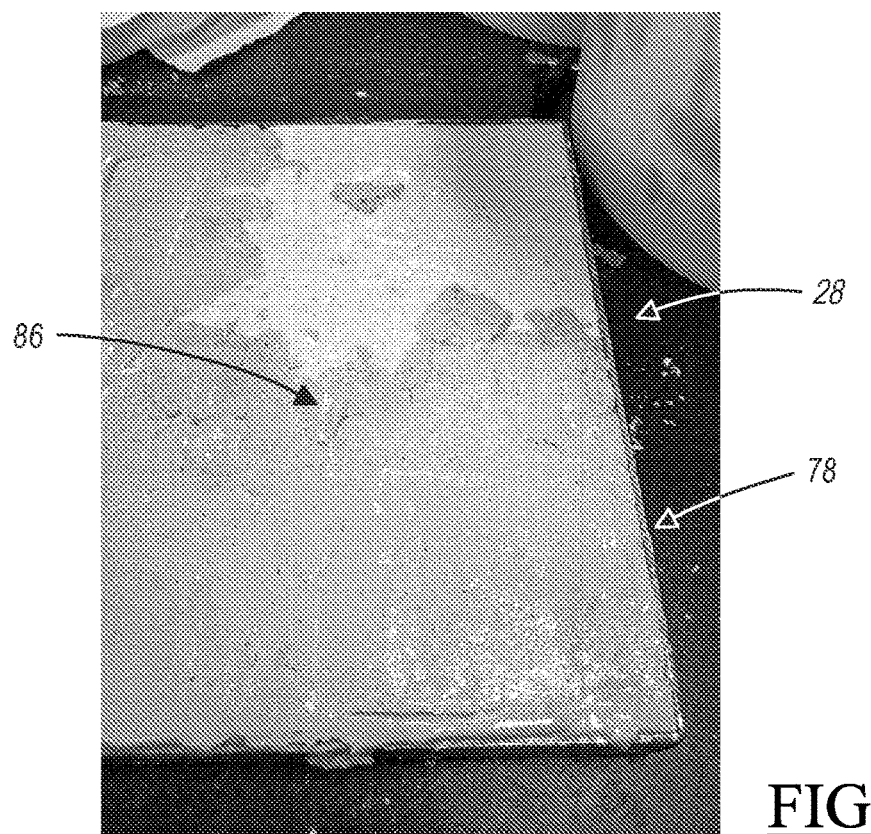
FIG. 15 is a photographic depiction illustrating a step of packing and/or compressing the cullet and binder solution mixture cast on the second outer wall in FIGS. 13 and 14.

Additionally, after the cullet and binder mixture has been placed, casting the cullet and binder mixture may include removing bubbles from the mixture by further packing/compressing the mixture. Casting the cullet and binder mixture may also include smoothing a surface of the mixture by applying additional sodium silicate solution to the surface. FIG. 15 illustrates an example where the mixture 86, after being applied to the second outer wall 28, has been packed and/or compressed to remove bubbles from the mixture 86, and a small amount of sodium silicate has been applied to further even and smooth the surface of the mixture 86. Some color variation may be visible in the cast sacrificial layer 74, which can be acceptable, because of variation in the powdered cullet.

Figure 16:
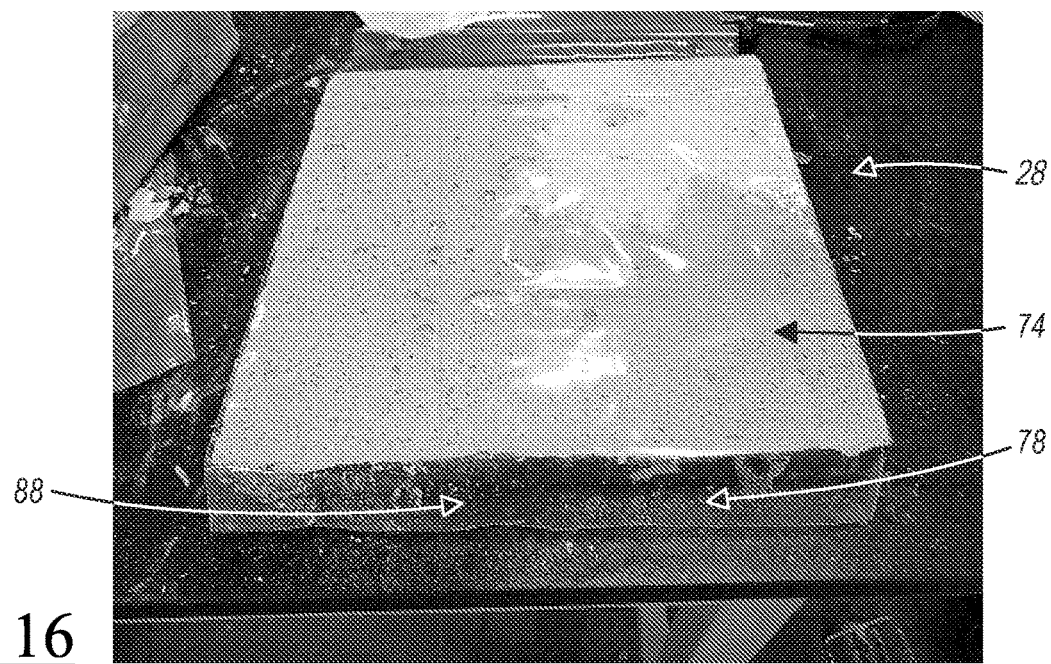
FIG. 16 is a photographic depiction illustrating a step of setting the cullet and binder solution mixture packed in FIG. 15 to form a cast sacrificial layer.

Subsequent to casting the cullet and binder mixture, the mixture can be allowed to set for a predetermined amount of time (e.g., 24-48 hours) to firm the cast sacrificial layer 74, as illustrated in FIG. 16. A material 88, for example a plastic film, can be placed over the cast sacrificial layer 74 during setting and may be removed prior to installation of the furnace panel 12. In some instances, the first outer edge 78 may be removed after the cast sacrificial layer 74 has set.

In some instances, method 100 may include a step 108 of coupling a plurality of the baffles 34 between the first outer wall 18 and the second outer wall 28 in the interior space 56.

Coupling the baffles 34 can include fitting a plurality of the projections 38, 42 on the plurality of baffles 34 into a corresponding plurality of openings 22, 32 in the first outer wall 18 and the second outer wall 28 and connecting (e.g., welding) the projections 38, 42 to the first outer wall 18 and the second outer wall 28 from outside the furnace panel 12 so that the first outer wall 18, the second outer wall 28, and the baffles 34 are fixed together.

Method 100 may also include a step 110 of fixing the sides walls 48, 50, 52, 54 to the first outer wall 18 and the second outer wall 28 so that the furnace panel 12 is fluid-tight. For example, fixing the side walls 48, 50, 52, 54 may include welding the side walls 48, 50, 52, 54 to the first outer wall 18 and/or the second outer wall 28 using, for example, a fillet weld.

In some instances, method 100 may include a step 112 of providing one or more protrusions 72 extending from the at least one outer wall (e.g., second outer wall 28) so that the one or more protrusions 72 embed into the cast sacrificial layer 74 during and after step 106 of casting the cullet and binder mixture. As previously discussed, the one or more protrusions 72 can assist the outer wall(s) in carrying the cast sacrificial layer 74 and/or in protecting the cast sacrificial layer 74 from cracking, chipping, breaking, or otherwise becoming damaged during use of the melting furnace 10. When protrusions 72 are utilized, the cullet and binder mixture can be cast onto the outer surface to a thickness that is greater than a length of the protrusions 72, and the mixture can be formed so that a surface area of the protrusions 72 is substantially contacted by the mixture.

In some instances, method 100 may include a step 114 of providing the first outer edge 78 extending about the perimeter (e.g., second perimeter 30) of the at least one outer wall so that the first outer edge 78 extends about the cast sacrificial layer 74 during and after step 106 of casting the cullet and binder mixture. The first outer edge 78 may be coupled to the at least one outer wall and/or to at least one of the side walls 48, 50, 52, 54 using a permanent method, for example welding, and/or a semi-permanent method, for example using fasteners (e.g., bolts, nuts, and the like). The first outer edge 78 can be used to provide a barrier when casting the cullet and binder mixture and can be configured so that the mixture is formed to a predetermined thickness on the outer surface and within the boundary established by the first outer edge 78. The first outer edge 78 may be removed subsequent to casting the cullet and binder mixture and/or forming the cast sacrificial layer 74. In this way, the first outer edge 78 may not be a permanent part of the furnace panel 12, but rather part of an intermediate structure of the furnace panel 12 to assist in its construction. The first outer edge 78 can also be attached as part of the construction, having any or all of the features discussed herein.

It will be appreciated that the furnace panel 12 can be included in any part of the melting furnace 10, and there can be as many furnace panels 12 as desired. In one aspect, the melting furnace 10 can include ten furnace panels 12 that are identical, for example. Having multiple identical furnace panels 12 allows the advantage of simpler manufacturing of at least a portion of the furnace panels 12 within the melting furnace 10. It will be appreciated that all furnace panels 12 in the melting furnace 10 could be identical to each other. Additionally, the melting furnace 10 can also include more furnace panels 12 that are similar, but not identical, to each other. In one aspect, the melting furnace 10 includes fourteen furnace panels 12 in addition to the ten identical furnace panels 12 that are in accordance with various aspects of this disclosure; however, each of the fourteen furnace panels 12 may be unique to any other furnace panels 12 within the melting furnace 10 in some way. It will be appreciated that all furnace panels 12 in the melting furnace 10 could be similar, but not identical, to each other.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The drawings are not necessarily shown to scale. The disclosure is intended to embrace all such modifications and variations as fall within the spirit and broad scope of the appended claims.

The invention claimed is:

1. A liquid-cooled melting furnace panel for a melting furnace that contains molten glass during use, the melting furnace panel comprising a metal wall and a cast sacrificial layer in direct contact with a surface of the metal wall that faces the molten glass during use, wherein, prior to installation of the furnace panel in the melting furnace, an entire thickness of the cast sacrificial layer has a composition that includes glass cullet particles held together by a sodium silicate binder, said composition being meltable in molten glass.

2. The melting furnace panel of claim 1, wherein the metal wall partly defines an interior space with fluid passages through which a coolant can flow such that the coolant flows along a surface of the metal wall opposite the surface that faces the molten glass during use.

3. The melting furnace panel of claim 1, wherein the wall is one of a first outer wall and a second outer wall partly defining an interior space between the first and second outer walls, the panel further comprising baffles extending between the first and second outer walls in the interior space, each baffle including projections received by openings in the first and second outer walls, the projections being connected to the first and second outer walls from outside the panel.

4. The melting furnace panel of claim 1, further comprising an outer edge extending about a perimeter of the wall so that the outer edge extends about the cast sacrificial layer.

5. The melting furnace panel of claim 1, further comprising an outer edge extending about a perimeter of the panel, the outer edge including a flange configured for attachment to an adjacent melting furnace panel.

6. The melting furnace panel of claim 1, further comprising one or more protrusions extending from the wall so that each of the one or more protrusions is embedded in the cast sacrificial layer.

7. The melting furnace panel of claim 1, wherein the cast sacrificial layer is a solid continuous layer covering the entire surface of the wall.

8. The melting furnace panel of claim 1, wherein the composition of the cast sacrificial layer, excluding water, is:
   91.25 to 99.25 weight % glass; and
   0.75 to 8.75 weight % binder.

9. The melting furnace panel of claim 1, wherein the cast sacrificial layer provides an insulating layer that reduces heat flux through the panel.

10. The melting furnace panel of claim 1, wherein the cast sacrificial layer provides a thermal barrier between the molten glass and the wall of the panel that reduces a thermal gradient in the wall.

11. The melting furnace panel of claim 1, wherein the cullet particles have a mean particle size in a range from 5 microns to 100 microns.

12. A liquid-cooled melting furnace panel for a melting furnace, comprising:
- a first wall;
- a metal wall spaced apart from the first wall;
- an interior space defined between the first wall and the metal wall with fluid passages in the interior space through which a coolant entering the interior space flows along a first face of the metal wall; and
- a cast sacrificial layer carried by and in direct contact with a second face of the metal wall opposite the first face of the metal wall and within a perimeter of the metal wall,
- wherein, prior to installation of the furnace panel in the melting furnace, an entire thickness of the cast sacrificial layer has a composition consisting essentially of a material that is meltable in molten glass.

13. The liquid-cooled melting furnace panel of claim 12, wherein the composition includes glass fused with sodium silicate.

\* \* \* \* \*